(12) United States Patent
Popham et al.

(10) Patent No.: US 10,279,681 B2
(45) Date of Patent: May 7, 2019

(54) VEHICLE HAVING WADE SENSING DISPLAY AND SYSTEM THEREFOR

(71) Applicant: Jaguar Land Rover Limited, Whitley, Coventry, Warwickshire (GB)

(72) Inventors: Thomas Popham, Chapelfields (GB); Jonathan Woodley, Warwick (GB); Sebastian Paszkowicz, Coventry (GB); Ian Barlow, Oxfordshire (GB); Zhou Xu, Coventry (GB); Edward Hoare, Worcestershire (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 97 days.

(21) Appl. No.: 15/035,880

(22) PCT Filed: Nov. 6, 2014

(86) PCT No.: PCT/EP2014/073934
§ 371 (c)(1),
(2) Date: May 11, 2016

(87) PCT Pub. No.: WO2015/071170
PCT Pub. Date: May 21, 2015

(65) Prior Publication Data
US 2016/0272066 A1    Sep. 22, 2016

(30) Foreign Application Priority Data
Nov. 12, 2013 (GB) .................................. 1319915.3

(51) Int. Cl.
*B60K 35/00* (2006.01)
*G01F 23/00* (2006.01)
(Continued)

(52) U.S. Cl.
CPC ....... *B60K 35/00* (2013.01); *B60W 30/18009* (2013.01); *B60W 40/02* (2013.01);
(Continued)

(58) Field of Classification Search
None
See application file for complete search history.

(56) References Cited

U.S. PATENT DOCUMENTS

2009/0112510 A1* 4/2009 Crane .................... G01B 21/18
                                                    702/166
2014/0371976 A1    12/2014 Gilling et al.

FOREIGN PATENT DOCUMENTS

EP    2698299 A1    2/2014
GB    2486452 A     6/2012
(Continued)

OTHER PUBLICATIONS

Combined Search and Examination Report corresponding to application No. GB1319915.3, dated Jun. 9, 2014, 5 pages.
(Continued)

*Primary Examiner* — Abby Y Lin
*Assistant Examiner* — Kyung J Kim
(74) *Attorney, Agent, or Firm* — Reising Ethington P.C.

(57) ABSTRACT

A vehicle comprises a system for aiding driver control of the vehicle when the vehicle is wading in a body of water, the system comprising a measurement apparatus for determining a measured depth of water in which the vehicle is wading. The measurement apparatus is positioned and arranged relative to the vehicle such that the measured depth is indicative of the depth of water in a first measurement region relative to the actual vehicle. The processor is coupled to the measurement apparatus and is configured to calculate an estimated water depth in dependence upon the measured depth and in dependence upon the vehicle speed.

25 Claims, 4 Drawing Sheets

(51) Int. Cl.
*G01B 21/18* (2006.01)
*B60W 50/14* (2012.01)
*B60W 30/18* (2012.01)
*B60W 40/02* (2006.01)
*B60W 40/06* (2012.01)

(52) U.S. Cl.
CPC ............ *B60W 50/14* (2013.01); *G01B 21/18* (2013.01); *G01F 23/0007* (2013.01); *B60K 2350/352* (2013.01); *B60W 40/06* (2013.01); *B60W 2050/146* (2013.01); *B60W 2520/10* (2013.01)

(56) References Cited

FOREIGN PATENT DOCUMENTS

| | | |
|---|---|---|
| GB | 2486453 A | 6/2012 |
| GB | 2499419 A | 8/2013 |
| WO | WO2012080435 A1 | 6/2012 |
| WO | WO2012080437 A1 | 6/2012 |
| WO | WO2012080438 A1 | 6/2012 |
| WO | WO2012123555 A1 | 9/2012 |

OTHER PUBLICATIONS

International Search Report corresponding with International application No. PCT/EP2014/073934, dated Feb. 16, 2015, 5 pages.
Written Opinion corresponding with International application No. PCT/EP2014/073934, dated Feb. 16, 2015, 6 pages.

\* cited by examiner

VEHICLE HAVING WADE SENSING DISPLAY AND SYSTEM THEREFOR

FIELD OF THE INVENTION

The present invention relates to a vehicle, to a system, to a method and to a program for estimating the depth of water surrounding a wading vehicle, optionally for providing to the driver, by virtue of an internally positioned display screen, information about the level of water relative to the exterior of the vehicle.

BACKGROUND

It is common for off-road vehicles to drive through a body of water and this is often referred to as a wading event. Driver caution and judgement is required when navigating a vehicle through a body of water at wading depth, i.e. at a depth at which the vehicle can be considered to be wading. This is because a vehicle driver does not generally know the depth of water the vehicle is about to enter or the nature of the terrain below the water surface. This is particularly so in low visibility conditions (dirty water, low-light, heavy rain, fog). It is recommended that a survey of the terrain is taken by wading through water on foot, but factors such as the variability of the terrain; low visibility conditions; inconvenience to the driver; and driver impatience may result in a driver attempting to traverse water without knowledge of the water depth and therefore without being able to take appropriate precautions.

In development of vehicle systems intended to aid a drivers control of a vehicle when wading through water, the present applicant has submitted a series of patent applications relating to the detection of a body of water using one or more sensors mounted externally on the vehicle. For example, in WO 2012/123555 a vehicle having a system comprising two ultrasonic transducer sensors, disposed on the left-side and right-side mirrors of the vehicle, operable in conjunction with an under-body mounted contact water sensor, is disclosed.

The present applicant has also submitted patent applications relating to the use of an in-vehicle cabin display screen for providing information to the driver of the vehicle. For example, in WO/2012/080435, WO/2012/080437 and WO/2012/080438 each to the present applicant, vehicles having display systems are disclosed in which an elevation of a vehicle is shown along with a current water level and data relating to a maximum wading depth and an advisory vehicle speed respectively.

It can be appreciated that the more data that is gathered regarding the detection of water and measurements relating to its depth relative to the vehicle, the more accurate a system for aiding wading may be. However, such data needs to be processed and analysed in real-time and in such a way that the data output on a display screen provides useful information in a clear and easily understood manner. It has been disclosed in WO/2012/080435, WO/2012/080437 and WO/2012/080438 to illustrate a detected water level by showing a straight line on an elevation of a display vehicle. Whilst a straight line representing a water level is a simple graphic which is easy for the driver to review and assimilate the necessary information, the determination of where to place such a line is not straightforward. This is especially so given the fact that the actual water being detected does not adopt a perfectly flat, smooth surface and is especially so when data from multiple sources regarding water level is obtained at different points across a moving, rippled and non-flat water surface.

The present invention in at least some embodiments seeks to provide a further improvement in systems for land-based vehicles for aiding driver control of those vehicles when wading.

SUMMARY

Aspects of the invention relate to a vehicle, to a system, to a method and to a program as claimed in the appended claims.

According to an aspect of the present invention for which protection is sought, there is provided a system for determining an estimated depth of water surrounding a wading vehicle having a front. The system comprises a measurement apparatus to determine a measured depth of water, the measurement apparatus having at least one sensor located at a first position rearward of the front of the vehicle. The system also comprises a processor coupled to the measurement apparatus and configured to generate, in dependence on at least the measured depth and a speed of the vehicle, an estimated water level.

Optionally, the estimated water level is one of: an estimated water depth at a location offset from said first position; and a level to be displayed on an HMI apparatus of the vehicle.

Optionally, the first position of the at least one sensor is adjacent to at least one side of the vehicle.

Optionally, the at least one sensor located at the first position is configured to measure a water depth at a first location, and wherein the estimated water level is an estimation of a depth at a second location, offset from the first location.

Optionally, the second location is offset from the first location along a longitudinal axis of the vehicle.

Optionally, the second location is proximate to the front of the vehicle.

Optionally, the at least one sensor comprises: a first remote water surface detection sensor disposed on one side of the vehicle, and a second remote water surface detection sensor disposed on the other side of the vehicle; and wherein the first and second remote water surface detection sensors are positioned on substantially a common lateral axis of the vehicle; said first and second sensors providing over time, to the processor, signals indicative of the depth of water measured by each remote water surface detection sensor.

Optionally, the first and second remote water surface detection sensors are mounted to a left side mirror and a right side mirror of the vehicle respectively.

Optionally, the processor generates the estimated water level further in dependence upon a shape and/or configuration of the vehicle.

Optionally, the processor generates the estimated water level further in dependence on a ride height of the vehicle.

Optionally, the system further comprises an output means for providing an output to a driver of the vehicle in dependence upon the estimated water level.

Optionally, the output means comprises an in-vehicle display system having a screen, and wherein the system is further configured to, in dependence upon the estimated water level, display on the screen a water display level.

Optionally, the system is configured to display at least a side elevation display vehicle graphic; and the system is further configured to superimpose the display level on the display vehicle graphic.

Optionally, the processor is configured to generate a display level profile that extends along the length of the side elevation display vehicle graphic, and wherein superimposing the display level on the display vehicle graphic comprises superimposing the display level profile on the display vehicle graphic.

Optionally, the display level profile comprises a straight line.

Optionally, the display level profile comprises a plurality of display level profile sections, each display level profile section showing an estimated water level at a different longitudinal position relative to the vehicle.

Alternatively, the display level profile comprises a curved line.

Optionally, the processor applies a scaling factor to one or more of the estimated water level and the display level to increase the estimated water level or the display level.

Optionally, the system further comprises at least one sensor configured to detect if the vehicle is travelling through a constrained body of water, and generating the estimated water level or display water depth further in dependence thereon.

Optionally, the system further comprises a memory means having at least one look-up table stored thereon correlating vehicle speed and measured depth to estimated water level, and wherein generating the estimated water level comprises the processor looking up the estimated water level based on measured depth and vehicle speed.

Optionally, the system further comprises a memory means having at least one look-up table stored thereon correlating vehicle speed and measured depth to an estimated depth factor, and wherein generating the estimated water level comprises the processor looking up the estimated depth factor and calculating the estimated water level based on the measured depth and the estimated depth factor.

Optionally, the memory means has a plurality of look up tables correlating vehicle speed and measured depth to estimated water level thereon, and in dependence on one or more measured vehicle parameters the processor selects a look up table corresponding to the measured vehicle parameters.

Optionally, the output means comprises an in-vehicle display system having a screen, and wherein the system is further configured to provide a numerical display depth on the screen.

Optionally, the output means comprises an audible signal, and wherein the audible signal varies in dependence on the proximity of the estimated water level to a threshold maximum wading depth.

Optionally, the system is configured to output an electrical signal to one or more other vehicle systems, the electrical signal indicative of one or more of: the estimated water level and the estimated water level exceeding a predetermined threshold.

Optionally, in dependence upon the electrical signal the one or more other vehicle systems is controlled.

Optionally, the estimated water level is additionally determined in dependence upon an estimated width of the water in which the vehicle is wading and/or in dependence upon a detection of one or more water barriers within a predetermined distance of one or both sides of the vehicle.

According to another aspect of the invention for which protection is sought, there is provided a vehicle comprising the system of any of the preceding paragraphs.

According to yet another aspect of the invention for which protection is sought, there is provided a method of determining the depth of water surrounding a wading vehicle. The method comprises: determining a measured depth of water using a measurement apparatus having at least one sensor located at a first position rearward of the front of a vehicle; and generating, in dependence on at least the measured depth and a speed of the vehicle; an estimated water level.

According to an even further aspect of the invention for which protection is sought, there is provided a program for a processor for use in a system for aiding driver control of the vehicle when the vehicle is wading, the program configured and arranged such that when running on the processor, the processor is configured to implement the method of the preceding paragraph.

An off-road vehicle may be defined as a road vehicle having some off-road capability—such as the provision of all wheel drive. Whereas at least one embodiment of the present invention provides particular benefit for off-road vehicles which may travel through bodies of water at wading depth more frequently than road-vehicles, it will be appreciated that one or more embodiments of the present invention may be applicable and useful in other types of road vehicle as well.

As used herein, the term "HMI-apparatus" refers to all manner of suitable devices that facilitate communication between the vehicle systems and a driver of the vehicle, HMI apparatus may be a single device or more than one device. HMI-apparatus may communicate visually, audibly, or produce a haptic warning or any combination thereof. Visual communications optionally may include: illuminating one or more warning lights, providing symbols, pictures, graphics and text which may be presented on any one or more or a combination of: a dash-board control panel, a display screen and a heads-up display. Audible communications optionally may include: warning beeps, alarms and voice-over information and may be output through any one or more or a combination of: any in-cabin speaker (including a driver-side ear-level speaker for communications directed at the driver only); head phones (optionally wireless) or an ear-piece (optionally wireless). It will be recognised that with advances in technology, various communication devices may become available that are suitable as an HMI-apparatus.

By "elevation" herein is meant, without limitation, an image, picture or other illustrative and visual representation.

In this specification, the term "wading" relates to travel of a land-based vehicle through water of a depth that is sufficient to require that the vehicle driver take appropriate precautions (wading depth). To distinguish a wading event from a vehicle driving through a shallow puddle, in some situations wading depth may be defined as water of 200 mm or more in depth. In some situations water at a level of the front or rear wheel hubs may be indicative of a vehicle in water at wading depth. In some situations wading depth may be defined as the point at which a sensor, for example a contact or remote sensor detects water at a predetermined depth, for example a water contact sensor is immersed in water. However; the depth at which it is determined that a vehicle is wading (sometimes referred to as a threshold wading depth) may be determined by the vehicle design and it is therefore not possible to define a threshold wading depth that is appropriate for all vehicles. Similarly, the permissible maximum wading depth of a vehicle is determined by the vehicle design, or may be dependent on vehicle configuration, for example the current ride height of a variable height suspension system.

Throughout the specification reference is made to the term "water". It will be understood that in the context of a land-based vehicle driving through water, the term "water" is intended to encompass all liquid media that a land-based vehicle may drive through and is not limited in its interpretation to pure $H_2O$. For example, as used herein water may mean, but is not limited to: a muddy river bed; sea-water; a ford; and dirty water in on-road and off-road terrain.

The methods, algorithms and control processes described herein can be machine-implemented. The methods; algorithms and control processes described herein can be implemented on one or more computational device(s) comprising one or more processors, for example, an electronic microprocessor. Such processor(s) may be configured to perform computational instructions stored in memory or in a storage device accessible by the processor(s).

Within the scope of this application it is envisaged that the various aspects, embodiments, examples and alternatives, and in particular the features thereof, set out in the preceding paragraphs, in the claims and/or in the following description and drawings, may be taken independently or in any combination thereof. For example, features described in connection with one embodiment are applicable to all embodiments, unless such features are incompatible.

BRIEF DESCRIPTION OF THE DRAWINGS

Embodiments of the present invention will now be described, by way of example only, with reference to the accompanying Figures in which.

DETAILED DESCRIPTION

Generally, aspects and embodiments of the present invention relate to a system for a vehicle having one or more water level detection sensors at one or more positions and having a control unit configured to analyze that data and to interpret the data. The analysis and interpretation of the data may be conducted using one or more or a series of algorithms, optionally arranged on one or more programs executable by the control unit.

As a vehicle progresses through a body of water, the vehicle displaces some of that water and in dependence upon the speed of the vehicle and typically also its shape and configuration, the vehicle's displacement of the body of water can create a bow wave at the front of or ahead of the vehicle, and a reduced water level adjacent to a side portion of the vehicle (longitudinally) spaced from the front of the vehicle. Additionally or alternatively, in scenarios where the body of water is confined to a relatively narrow width, the vehicle's displacement of water can create a "wall effect" with peaks and troughs occurring in the water level as displaced water is reflected by the wall or barrier. Beneficially, the analysis and interpretation carried out by the systems of the present disclosure are configured to compensate for and to consider the effect of the vehicle's speed and hence the vehicle's displacement of the water as the vehicle travels through the water.

As such, aspects and embodiments of the present invention relate to a system for a vehicle that at least uses remote ranging and optionally contact sensors to track the rise and fall of a water level, at one or more discrete location relative to the vehicle, as the vehicle progresses through the water and optionally as the vehicle approaches, enters and departs from the water. The system is configured to determine a display depth in consideration of peaks and/or troughs occurring in the measured water level to provide a useful guide for a driver of the vehicle.

Figure 1:
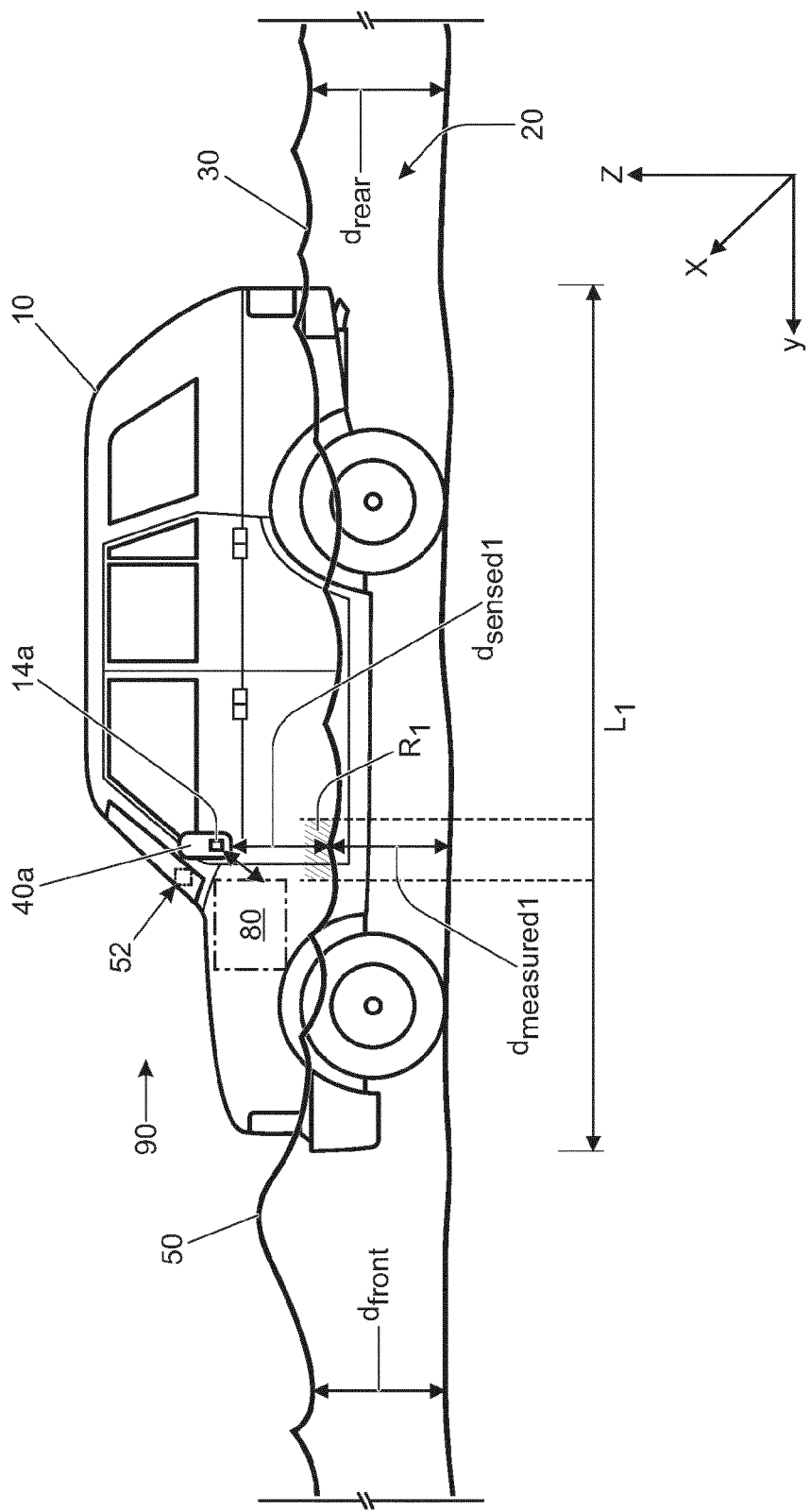
FIG. 1 is a schematic side view of an actual off-road vehicle in a wading scenario, wherein the presence of the vehicle displaces water and creates a bow-wave in front of the vehicle. A system of the vehicle according to an embodiment of the invention is also shown, wherein detection of a water surface in a first location (also referred to as first longitudinal region), by a left-side mirror mounted sensor, is shown.

Referring to FIG. 1, there is shown a vehicle 10 of length $L_1$ comprising a system 90 having a control unit 80, at least one remote sensor 14a, which in this embodiment includes two sensors: a first ultrasonic transducer sensor 14a mounted to a left-side mirror 40a of the vehicle 10; and a second ultrasonic transducer sensor (not shown) mounted to a right-side mirror (not shown) of the vehicle 10 the first and second ultrasonic transducer sensors 14a are positioned on the vehicle 10 on the same lateral axis (x-axis) thereof. The first ultrasonic transducer sensor 14a is configured to emit and receive a pulsed ultrasonic signal. The time of receipt of an echoed ultrasonic signal is indicative of a distance $d_{sensed1}$, between the first ultrasonic transducer sensor 14a and the surface level 30 of a body of water 20 in a first measurement region $R_1$ adjacent to the vehicle 10. The first measurement region $R_1$ is approximately at the same longitudinal axis (y-axis as illustrated in FIG. 1) along the vehicle 10 as the first ultrasonic transducer sensor 14a, however, it will be appreciated that in dependence upon the angle(s) of incidence of a signal emitted by the first sensor 14a that water depth may be measured within a region $R_1$. The mounting height $h_{sensor1}$, $h_{sensor2}$ of each of the first and second ultrasonic transducer sensors 14a is known and in the vehicle 10 an adjustable suspension system (not shown) permits the adjustment of the ride height (RH) of the vehicle 10. The control unit 80 is provided with the current vehicle ride height (RH) of the vehicle 10 and therefore, in conjunction with the mounted height of the first and second sensors 14a and the distance $d\text{-}_{sensed1}$, the control unit 80 of the system 90 is configured to determine a first measured depth $d_{measured1}$ in a first location that is relative to the longitudinal and lateral position (also referred to as first position) of the first sensor 14a. In this embodiment, the measurement of water depth $d_{measured1}$ at the first location is in the region denoted by $R_1$.

As can be seen in FIG. 1, the progression of the vehicle 10 through the body of water 20 causes displacement of a volume of the body of water and has caused the creation of a peak 50 in the actual water level in front of the vehicle 10. This peak 50 is often referred to as a bow wave 50. In addition, a depression in the actual water level of the body of water relative to the vehicle 10 has been created by the vehicle's displacement of the water, and this trough occurs in or about the first region $R_1$. As such, the water level relative to the vehicle 10 is not constant in the vehicle's 10 longitudinal axis (y-axis). Furthermore, although the side mirrors make convenient places to mount downward facing remote ranging sensors, they are located at a position relative to the longitudinal axis of the vehicle such that the first measured depth $d_{measured1}$ taken in the first location is indicative of the depth of the water in the region $R_1$ where the water level is depressed.

Figure 2:
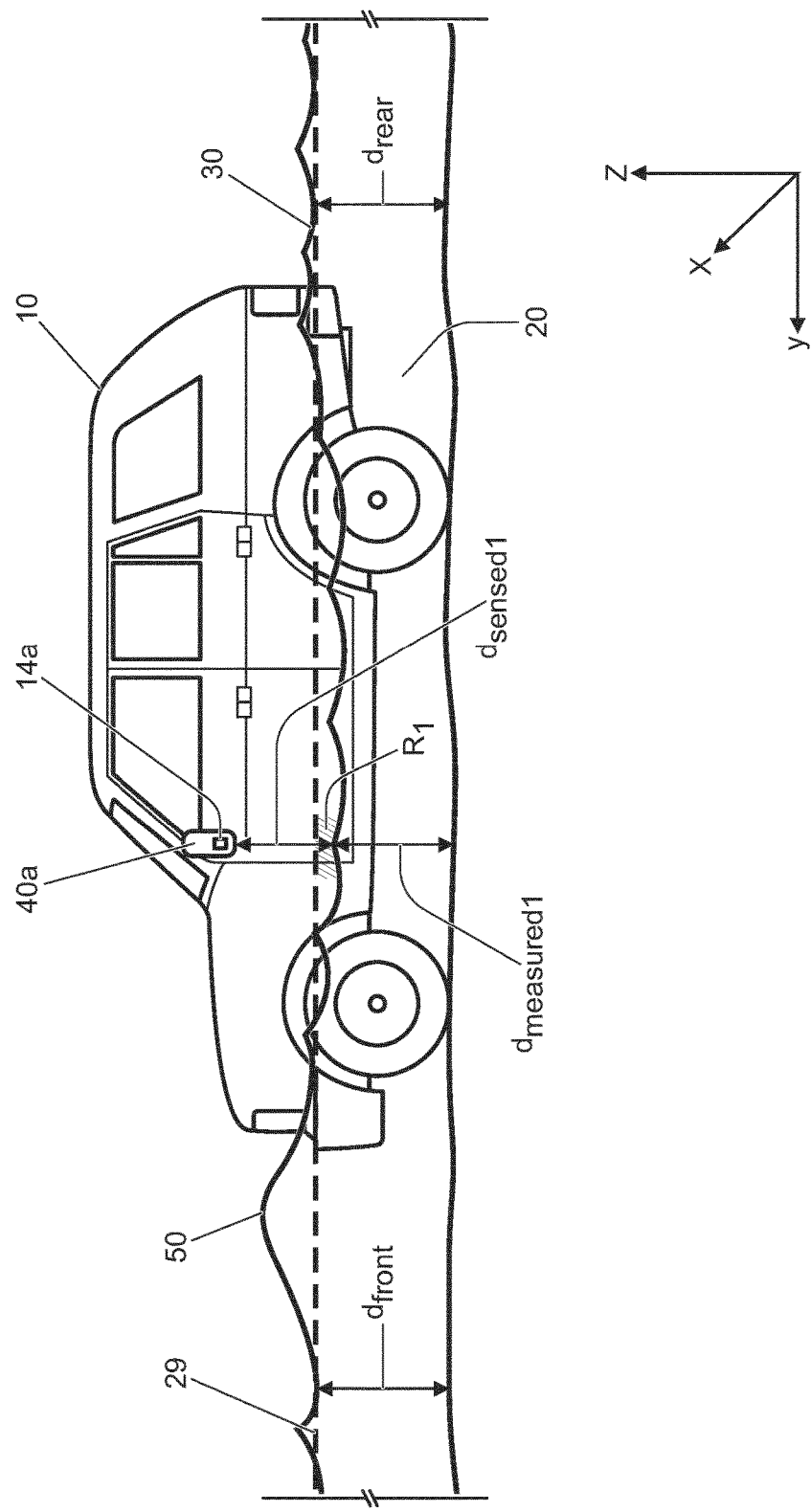
FIG. 2 is a similar schematic side view to that shown in FIG. 1, albeit some reference numerals are omitted and a notional line is added, which is an extrapolation of an actual water level proximate to the rear of the vehicle.

The difference between the level of water at the bow wave 50 and the depression in the region $R_1$ is illustrated in FIG. 2. In FIG. 2, the image of FIG. 1 has been repeated, albeit with certain numbering removed and additional reference lines added to more clearly show the depression in the water surface level 30 in region $R_1$; the bow wave 50; the actual depth of water $d_{front}$ in front of the vehicle 10 beyond the bow wave (presuming the surface on which the vehicle is travelling is substantially flat); and the actual depth of water behind of the vehicle 10 (again presuming the surface on which the vehicle is travelling is substantially flat). A notional dotted line 29 has been added to show that the actual water level at the bow wave 50 is greater than the actual water level at the rear of the vehicle $d_{rear}$; and to show that the actual water level in the first location (region) $R_1$ is lower than the water level at the rear of the vehicle $d_{rear}$. The notional line 29 also shows that, once the bow wave 50 has diminished, the actual depth of water behind the vehicle $d_{rear}$ is similar to that at the front of the vehicle $d_{front}$.

In the presently illustrated embodiment of the invention, the control unit 80 is configured to determine a display depth 21 (see FIG. 4) that is based upon the first and/or second measured depths $d_{measured1}$, $d_{measured2}$. An algorithm 67 that is contained within a program stored on or associated with the control unit 80 and that is executed by the control unit 80 of the system 90 is illustrated schematically in FIG. 3.

Figure 3:
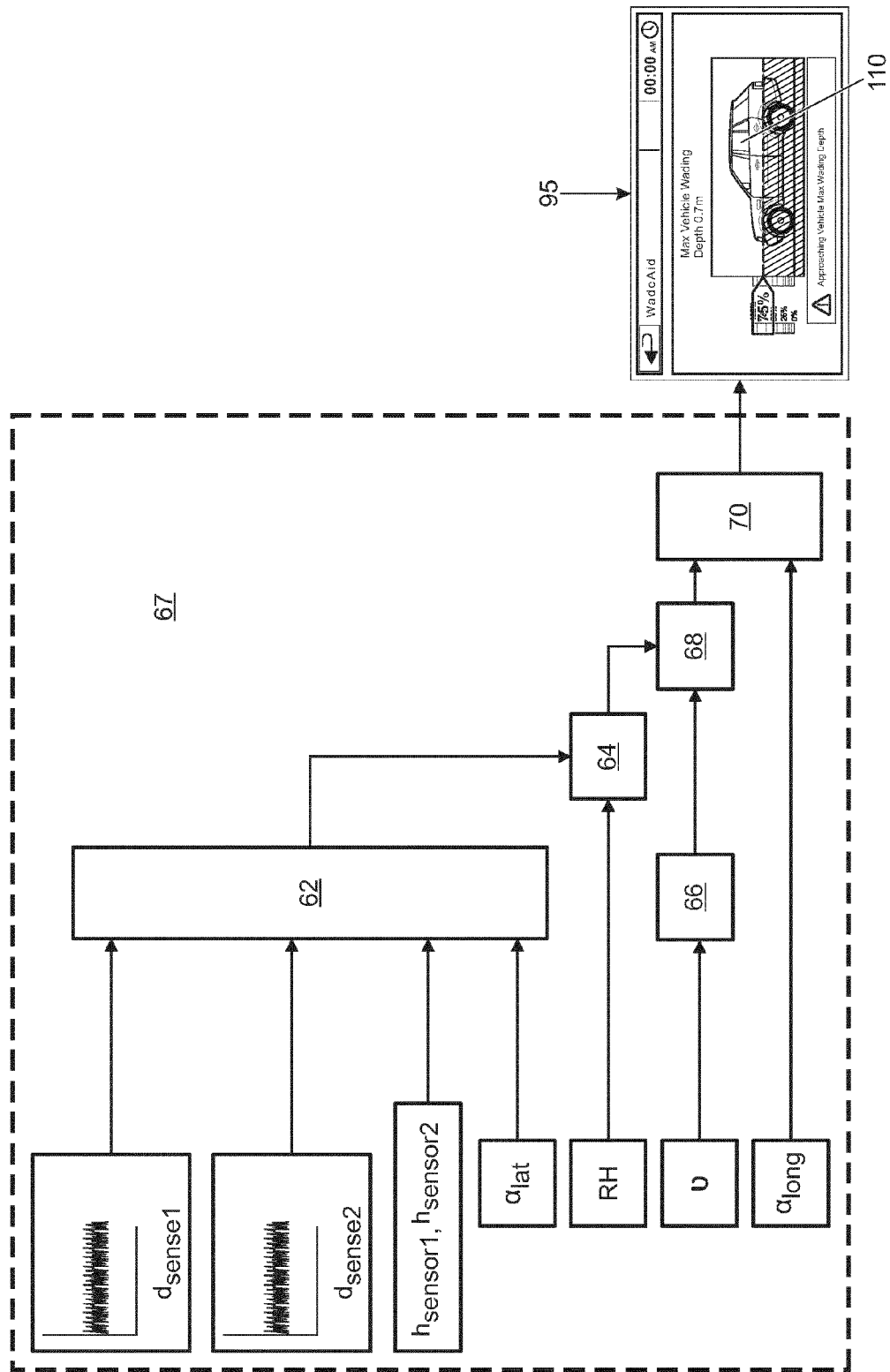
FIG. 3 is a schematic illustration of an algorithm conducted by a program when running on a processor of the system illustrated in FIG. 1.

In FIG. 3 it can be seen that first and second data signals $d_{sense1}$, $d_{sense2}$ derived from the first and second sensors 14a, are inputs to the algorithm 67. The distances $d_{sense1}$ and $d_{sense2}$ are optionally each time-averaged over a sample period before being input into a first processing block 62. In addition to the first and second data signals $d_{sense1}$, $d_{sense2}$ from the first and second sensors 14a, the following time varying values of: lateral angle $\alpha_{lat}$ of the vehicle 10; longitudinal angle $\alpha_{long}$ of the vehicle 10; current ride height 'RH' of the vehicle 10; and speed v of the vehicle 10 may also be inputs to the algorithm 67. In addition certain constants may be input, for example the mounting height $h_{sensor1}$, $h_{sensor2}$ of the first and second sensors 14a.

Information from other vehicle systems may be transmitted directly to the system 90 from the vehicle control system having that data (for example, a suspension system control unit may communicate the ride height 'RH' directly to the control unit 80). Alternatively data such as currently selected (and adopted) ride height 'RH' and vehicle speed v may be transmitted via a vehicle CAN-bus or similar vehicle-based data network.

Interim values for the first and second measured depths $d_{measured1}$, $d_{measured2}$ are determined at processing block 62 by using the following equations:

$$d_{measint1} = h_{sensor1} - h_{sense1}$$

$$d_{measint2} = h_{sensor2} - h_{sense2}$$

Optionally, a checking step may be carried out to determine which of the first and second distances $d_{sense1}$ $d_{sense2}$ and/or first and second interim depth measurements $d_{measint1}$, $d_{measint2}$ should be utilized by the algorithm 67 in determining a display depth. For example, if the lateral angle $\alpha_{lat}$ of the vehicle 10 indicates that the vehicle 10 is flat or substantially flat, it is reasonable to assume therefore that the actual depths of water beneath the first and second sensors 14a will be about the same. In addition, if the first and second measured depths $d_{measured1}$ $d_{measured2}$ are about the same, for example are within ±a tolerance Δt of one another, (Δt may be about 100 mm to give consideration to water surface ripples etc.), then the first and second data signals $d_{sense1}$ $d_{sense2}$ may then be averaged with one another. This may be carried out before or after a compensation is carried out to account for the effect of vehicle speed, shape and/or size (referred to generally as vehicle displacement). Alternatively, if the lateral angle $\alpha_{lat}$ of the vehicle 10 indicates that the vehicle 10 is on a lateral gradient and if the first and second measured depths $d_{measured1}$ $d_{measured2}$ are different to a degree that would be expected for such a lateral gradient (again within a tolerance Δt), then, optionally only the data signal derived from the sensor on the lowest side of the vehicle may be utilised in determining a display depth.

Thereafter, a compensation is made to either one of the first and second measured depths $d_{measint1}$, $d_{measint2}$, or to their average ($\overline{d_{measint1}, d_{measint2}}$), to account for the ride height "RH" of the vehicle 10 by adding a ride height off-set ΔRH at block 64. This computation may be set out as follows:

$$d_{measured1} = d_{measint1} + \Delta RH,$$

$$d_{measured2} = d_{measint2} + \Delta RH, \text{ or}$$

$$d_{measured} = \overline{d_{measint1}, d_{measint2}} + \Delta RH$$

Thereafter, a compensation for one or more effects of vehicle displacement is made:

$$\text{displaydepth} = d\text{measured} + \Delta \text{dis}(v)$$

At block 66, the vehicle speed v is used to reference or to compute an appropriate vehicle displacement compensation Δdis(v). Where a look-up table of values for vehicle displacement compensation Δdis(v) is provided; which is referenced in dependence upon vehicle speed v, it is envisaged that the look-up table contains calibrated values appropriate for the shape and size of the vehicle 10. The applicable offset Δdis(v) is optionally sized to increase the measured depth in the first measurement region $R_1$ (where the actual water level is depressed because of the vehicle's displacement of the body of water 20), substantially to the level indicated by notional line 29. The notional line 29 represents a static water level at the front and rear of the vehicle 10. In other words, a display level 17 determined by the system 90 is intended to provide a scaled approximation of the water level that the vehicle 10 would otherwise be disposed in under static conditions (of vehicle 10 and water 20) and as if no bow wave 50 had been created and as if no depression had been created in the measurement region $R_1$.

At processing block 68 the vehicle displacement compensation factor Δdis(v) is applied and output therefrom is a display depth for the first measurement region $R_1$. The value of the vehicle displacement compensation factor Δdis(v) is determined in dependence upon: vehicle speed v, and optionally also on vehicle shape and size and/or the measured depth $d_{measured1}$, $d_{measured2}$, and/or position of the remote sensors 14a. This is because the difference between a measured depth $d_{measured1}$, $d_{measured2}$ and the water level 29 that might otherwise have been observed if both the body of water 20 and the vehicle 10 were static, depends upon the way in which the water 20 is being displaced by the vehicle 10. The extent of creation of a bow wave 50 is dependent upon vehicle speed v. The size of the corresponding depression longitudinally spaced from the bow wave 50 also depends upon vehicle speed v, water depth and the shape and volume of the vehicle 10 that is pushing the water 20 out of its path and displacing the water 20 in front of and to the sides of the vehicle 10.

The vehicle displacement compensation factor $\Delta dis(v)$ is, in the present embodiment, obtained empirically from test data for the particular vehicle 10 shown in FIG. 1. It is envisaged that a referenceable look-up table of values of the vehicle displacement compensation factor $\Delta dis(v)$ for other shapes and arrangements of vehicle may be extrapolated from empirical data gathered in relation to the vehicle 10, if the other vehicles are of similar size and configuration. In an embodiment, a referenceable look-up table of values of the vehicle displacement compensation factor $\Delta dis(v)$ for other shapes and arrangements of vehicle may be generated from new empirical data for those vehicles. In yet other embodiments, it is envisaged that the vehicle displacement factor $\Delta dis(v)$ may be calculated (either in real time or prior to installation of the system). Such a calculation may be dependent upon vehicle speed v, the measured depth ($d_{measured1}$, $d_{measured2}$) and optionally the size (optionally including volume) of all or part of the vehicle and may be based upon empirically gathered data.

At processing block 70, the display depth is optionally scaled to determine a scaled display depth 21. The scaled display depth 21 is then extrapolated, optionally linearly, in order to determine where a display level 17, relative to a display vehicle 110, is shown on a display screen 95 of an in-vehicle HMI apparatus 52 (see FIGS. 4, 3 and 1).

In dependence upon the longitudinal gradient of the vehicle 10, the display vehicle 110 is shown on a longitudinal incline. In other envisaged embodiments, in dependence upon the longitudinal gradient of the vehicle 10, the display vehicle 110 is shown as being level and the display level 17 of the water is shown as inclined (in such an embodiment, the scaled display depth 21 is extrapolated in proportion to a display angle, which display angle is dependent upon the longitudinal angle $\alpha_{long}$ of the vehicle). In both embodiments, the display level 17 may be positioned such that in the region on the display vehicle 110 that is equivalent to the first measurement region $R_1$, the scaled display level 21 represents a scaled approximation of the calculated display depth.

Figure 4:
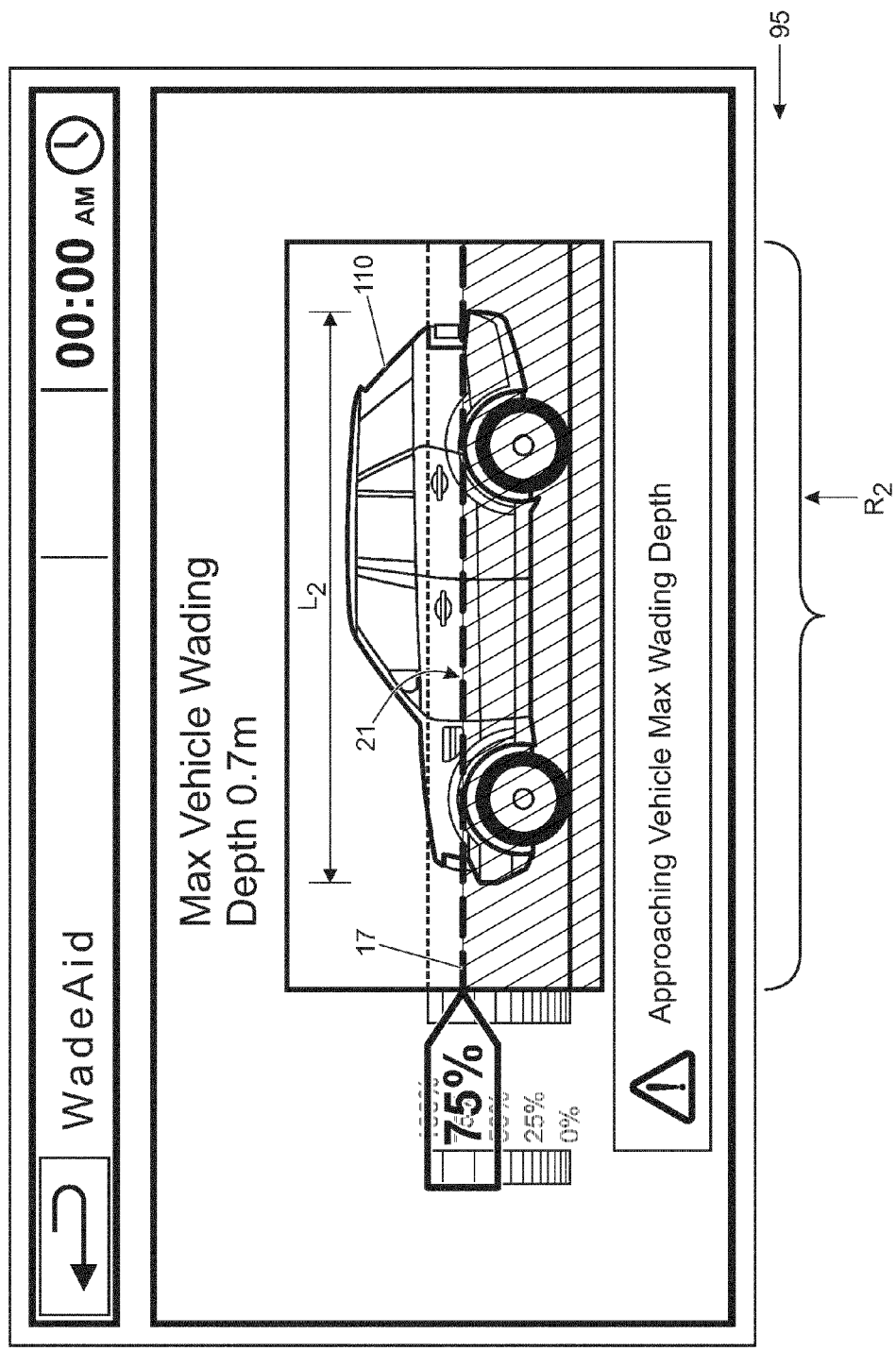
FIG. 4 is a view of an in-vehicle cabin HMI display screen, showing a side elevation of a display vehicle and showing a water display level superimposed thereon. The water level is illustrated as a straight line at a constant display depth.

It can be seen in FIG. 4 that once the scaled display depth 21 has been extrapolated that the resulting display level 17 spans or covers a second longitudinal region $R_2$ relative to the display vehicle 110. It can be seen that the second longitudinal region $R_2$ relative to the display vehicle 110 covers a greater percentage of the longitudinal length of the display vehicle 110 than the percentage of the longitudinal length $L_1$ of the actual vehicle 10 that is spanned by said first measurement region $R_1$. In this way the system 90 provides the driver with a clear graphical indication of the status of a body of water 20 relative to the entire length of the vehicle 10 which has been derived from depth measurement data taken at only one longitudinal location (in region $R_1$) of the vehicle 10 (i.e., at the position of the side mirror sensors 14a, which are offset rearward from the front of the vehicle 10). In FIG. 4 the display vehicle 110 of length $L_2$, has a display level 17 superimposed thereon, the length of which display level 17 is greater than 100% of the length $L_2$ of the display vehicle 110. In other envisaged embodiments, the display level 17 may span a percentage of between about 60% to about 150% of the length $L_2$ of the display vehicle 110.

Optionally, the display level 17 is a straight line, but in other embodiments it is envisaged that a slightly wavy line could be used to convey that the display line relates to the water level and to convey that the water is a fluid body. In such embodiments, the display level may be positioned relative to the display vehicle 110 such that at the scaled point on the display vehicle 110 that is equivalent to $R_1$, the display level represents the display depth.

In another non-illustrated embodiment, it is envisaged that the applicable offset $\Delta dis(v)$ is optionally sized to bring the display depth in the depressed region $R_1$ up to the top of the bow wave peak 50. Alternatively, the display depth level may be shaped to show the bow wave 50.

In other envisaged embodiments the vehicle displacement compensation factor $\Delta dis(v)$ is configured to adjust the measured depth to create a scaled display depth and a display level extrapolated therefrom that represents the approximate height of an anticipated bow wave (again giving consideration to vehicle speed v, measured water depth and vehicle longitudinal and lateral gradients).

In yet another non-illustrated embodiment, it is envisaged that the displacement compensation offset $\Delta dis(v)$ also compensates for a "wall effect". In such an embodiment, one or more vehicle mounted sensors such as a camera or radar are positioned and arranged to detect objects to the side of the vehicle as the vehicle progresses through a body of water. In other words, the sensors determine that the vehicle is progressing through a constrained body of water. The sensors are configured to determine whether the water in which a vehicle is wading is restricted or bounded by a wall or barrier on one or both sides of the vehicle such that the body of water is confined to some extent at least and is not freely displaceable by the vehicle. Optionally, in such an embodiment if it is detected that the width between the vehicle and the barrier of the water at or upstream of one or both sides of the vehicle, is within a pre-defined threshold width, then an additional compensation factor may be added to the display level. This may be to inform the driver of an increased water level compared to that which may have been measured in order to account for the fact that water displaced by the vehicle may be reflected by the "walls" or barriers and may cause a wave of water to re-approach the vehicle. The pre-defined threshold may be dependent upon vehicle speed, measured depth, lateral and longitudinal gradients of the vehicle and may be defined as a percentage. In at least some embodiments, the compensation factors applicable for different situations may be empirically determined and stored in a memory means, for example a look up table.

In other envisaged embodiments a vehicle displacement compensation factor $\Delta dis(v)$ may comprise more than one component. For example: a first component $\Delta dis1(v)$ to compensate for a depression in a measurement region $R_1$ and a second compensation component $\Delta dis2(v)$ to account for a wall effect. Such a second component may have a zero value if no wall or barrier restricting the displacement of the body of water by the vehicle is detected, but may have a non-zero value if a wall or barrier restricting the displacement of the body of water by the vehicle is detected.

As a further example, a vehicle displacement compensation factor $\Delta dis(v)$ may comprise three components: a first component $\Delta dis1(v)$ to compensate for a depression in a measurement region $R_1$, a second compensation component $\Delta dis2(v)$ to account for a wall effect; and a third component $\Delta dis3(v)$ to compensate for a bow wave. Such a second component may have a zero value if no wall or barrier restricting the displacement of the body of water by the vehicle is detected, but may have a non-zero value if a wall or barrier restricting the displacement of the body of water by the vehicle is detected.

In other envisaged embodiments, the system comprises additional water level sensors, which may be contact water level sensors such as ultrasonic sensors, capacitive, resistive or hydrostatic sensors, configured to measure at least a minimum depth of water in a region in close proximity to them. Such sensors may provide a guide or actual measurement as to the real water level at the front of the vehicle ($d_{front}$) and/or the real water level at the rear of the vehicle ($d_{rear}$) and the data obtained therefrom may be used in conjunction with the data gathered from one or two side mirror mounted sensors to determine a display depth and/or a display level. Additionally or alternatively the contact sensors (such as a submersion ultrasonic transducer) may provide an indication that the vehicle is wading and that aspects of the disclosed system should be activated.

In other embodiments of the invention it is envisaged that other forms of remote water depth sensor may be utilized. Such remote sensors may for example include, but are not limited to, one or more or a combination of: acoustic, electromagnetic and optical type sensors to measure reflections from the surface of the water. Said contact sensors may optionally include liquid level measurement sensors, for example including but not limited to sensors measuring a change, due to the presence of water, in: pressure, electrical characteristic (for example capacitance, resistance, dielectric constant), electromagnetic (for example optical, including optic fibres) and radio frequency (time-of-flight).

It will be appreciated that the system of the present disclosure may have application in a vehicle in systems other than wade assisting systems and/or may be used in a number of beneficial ways within a wade assisting system. As such estimating a water level in dependence on a measured depth and a speed of the vehicle may be utilized by other vehicle systems. The estimated water level may be used for purposes other than outputting a visual display of a vehicle having a water display level superimposed thereon. The estimated water level may be used as an estimation of an actual water depth at a location off set from the measurement location, or may be used as a water display level, or, by way of a further non-limiting example, may be used to determine a warning beep frequency.

The invention claimed is:

1. A system for determining an estimated depth of water surrounding a wading vehicle having a front, the system comprising:
   a measurement apparatus to determine a measured depth of water, the measurement apparatus having at least one sensor located at a first position rearward of the front of the vehicle; and
   a processor coupled to the measurement apparatus and configured to generate, in dependence on at least the measured depth and a speed of the vehicle, an estimated water level, and
   an in-vehicle display system having a screen and configured to display at least a side elevation display vehicle graphic, and wherein the system is further configured to, in dependence upon the estimated water level, superimpose on said screen a water display level profile, generated by said processor, extending along the length of the side elevation display vehicle graphic,
   wherein said water display level profile comprises a plurality of display level profile sections, each display level profile section showing an estimated water level at a different longitudinal position relative to the vehicle.

2. A system according to claim 1 wherein said estimated water level is one of: an estimated water depth at a second location offset from said first position; and a level to be displayed on a human-machine interface (HMI) apparatus of the vehicle.

3. A system according to claim 1 wherein said first position of said at least one sensor is adjacent at least one side of the vehicle.

4. A system according to claim 1 wherein the least one sensor located at said first position is configured to measure a water depth at a first location, and wherein said estimated water level is an estimation of a depth at a second location, offset from the first location.

5. A system according to claim 4 wherein said second location is offset from said first location along a longitudinal axis of the vehicle.

6. A system according to claim 4 wherein said second location is proximate to the front of the vehicle.

7. A system according to claim 1, wherein said at least one sensor comprises: a first remote water surface detection sensor disposed on one side of the vehicle, and a second remote water surface detection sensor disposed on the other side of the vehicle; and wherein the first and second remote water surface detection sensors are positioned on substantially a common lateral axis of the vehicle; said first and second sensors providing over time, to the processor, signals indicative of the depth of water measured by each said remote water surface detection sensor.

8. A system according to claim 7 wherein the first and second remote water surface detection sensors are mounted to a left side mirror and a right side mirror of the vehicle respectively.

9. A system according to claim 1 wherein the processor generates said estimated water level further in dependence upon a shape and/or configuration of the vehicle.

10. A system according to claim 1 wherein the processor generates said estimated water level further in dependence on a ride height of the vehicle.

11. A system according to claim 1 wherein said display level profile comprises a straight line.

12. A system according to claim 1 wherein the display level profile comprises a curved line.

13. A system according to claim 1 wherein the processor applies a scaling factor to one or more of the estimated water level and the display level to increase said estimated water level or the display level.

14. A system according to claim 1 further comprising at least one sensor configured to detect if the vehicle is travelling through a constrained body of water, and generating a different estimated water level in dependence thereon.

15. A system according to claim 1 further comprising a memory means having at least one look-up table stored thereon correlating vehicle speed and measured depth to estimated water level, and wherein generating said estimated water level comprises the processor looking up said estimated water level based on measured depth and vehicle speed.

16. A system according to claim 15 wherein said memory means has a plurality of look up tables correlating vehicle speed and measured depth to estimated water level thereon, and in dependence on one or more measured vehicle parameters the processor selects a look up table corresponding to said measured vehicle parameters.

17. A system according to claim 1 further comprising a memory means having at least one look-up table stored thereon correlating vehicle speed and measured depth to an estimated depth factor, and wherein generating said estimated water level comprises the processor looking up said estimated depth factor and calculating said estimated water level based on the measured depth and the estimated depth factor.

18. A system according to claim 1 wherein the system is further configured to provide a numerical display depth on said screen.

19. A system according to claim 1 further comprising an output means comprising an audible signal, and wherein said audible signal varies in dependence on the proximity of the estimated water level to a threshold maximum wading depth.

20. A system according to claim 1 wherein the system is configured to output an electrical signal to one or more other vehicle systems, said electrical signal indicative of one or more of: said estimated water level and said estimated water level exceeding a predetermined threshold.

21. A system according to 20 wherein, in dependence upon said electrical signal the one or more other vehicle systems is controlled.

22. A system according to claim 1 wherein estimated water level is additionally determined in dependence upon an estimated width of the water in which the vehicle is wading and/or in dependence upon a detection of one or more water barriers within a predetermined distance of one or both sides of the vehicle.

23. A vehicle comprising the system of claim 1.

24. A method of determining an estimated depth of water surrounding a wading vehicle having a front, the method comprising:
  determining a measured depth of water using a measurement apparatus having at least one sensor located at a first position rearward of the front of a vehicle; and
  generating, in dependence on at least the measured depth and a speed of the vehicle, an estimated water level, and
  displaying on an in-vehicle display system having a screen at least a side elevation display vehicle graphic and, in dependence upon the estimated water level, superimposing on said screen a water display level profile generated by said processor that extends along the length of the side elevation display vehicle graphic,
  wherein said water display level profile comprises a plurality of display level profile sections, each display level profile section showing an estimated water level at a different longitudinal position relative to the vehicle.

25. A non-transitory computer-readable carrier medium having a program for a processor stored thereon for use in a system for aiding driver control of the vehicle when the vehicle is wading, the program configured and arranged such that when running on the processor, the processor is configured to implement the method of claim 24.

* * * * *